Patented June 23, 1931

1,811,242

UNITED STATES PATENT OFFICE

JOHN D. MORGAN, OF MAPLEWOOD, NEW JERSEY, AND WILLIAM G. BJORKSTEDT, OF JAMAICA, AND RUSSELL E. LOWE, OF NEW YORK, N. Y., ASSIGNORS TO DOHERTY RESEARCH COMPANY, OF NEW YORK, N. Y., A CORPORATION OF DELAWARE

HEAT CONDUCTING HIGH TEMPERATURE RESISTANT REFRACTORY

No Drawing.    Application filed June 11, 1928.  Serial No. 284,668.

The present invention relates to a composition of matter and to a method of making the same. More particularly the invention relates to refractory materials capable of continued use at high temperatures and having a high coefficient of heat transmission.

The metals used for engineering structures have good heat conductivity, but are subject to rapid deterioration when in contact with gas at temperatures of 2000° F. or over. It is common practice therefore when structures are to be subjected to high temperature gases to make them of non-metallic refractory materials. It is true, of course, that certain alloys are known which are capable of continued use at high temperatures, but these alloys are quite expensive. Moreover the metals capable of use at high temperatures are quite heavy and sometimes difficult to shape.

One of the objects of the present invention is to provide a material or composition capable of continued use at high temperatures which shall have a high coefficient of heat transmission.

A second object of the present invention is to provide a high temperature material or composition which shall be highly conductive, but comparatively resistant to compressions at temperatures above 2000° F. and relatively cheap to manufacture.

A third object of the present invention is to provide a high temperature conducting material which will not change in volume under prolonged heating.

The present invention is based on the discovery that the metal silicon, or its alloy, ferrosilicon, is capable of being mixed and bonded with a relatively high percentage of non-metallic refractory material without causing a proportional decrease in the heat conductivity of the silicon or ferrosilicon and that the resulting material or composition of matter is resistant to high temperature gases.

Pure metallic silicon possesses a coefficient of heat conductivity of 0.20 calories per centimeter per second per degree C. The conductivity of high grade ferrosilicon is slightly less than that of the pure silicon. However, metallic silicon or high grade ferrosilicon, while of high melting point, is not sufficiently resistant to gaseous erosion and corrosion at high temperatures for general engineering use in high temperature apparatus, but it has been found that 35% or more of non-metallic refractory mixed with silicon greatly improves its resistance to gaseous erosion and corrosion. Such a mixture of silicon and refractory has also a high resistance to compression at high temperatures. It has been found further that, in order to maintain the heat conductivity of the article made from a mixture of silicon or ferrosilicon and non-metallic refractory, it is not necessary to melt the silicon and refractory together, but that the two may be bonded in a manner similar to that ordinarily employed in bonding carborundum or like non-metallic refractory. According to the present invention, as much as equal proportions by weight of non-metallic refractory may be mixed with the silicon or ferrosilicon to make a composition having a coefficient of heat conductivity of at least one-half that of cast iron at temperatures of 2000° and over.

It has been found that for best results it is necessary that the non-metallic refractory which is mixed with the silicon or ferrosilicon shall have a small coefficient of thermal expansion or contraction when heated. The mineral zircon, although very effective as a heat insulator when used alone, has a very low coefficient of expansion per degree of change in temperature and is the preferred non-metallic refractory element of the composition. Other non-metallic refractory materials having a low coefficient of expansion or contraction when heated may be substituted for the zircon. The invention, however, is not limited to a non-metallic substance of low volume change.

Metallic silicon, although capable of resisting fairly high temperatures, has the disadvantage as a material for engineering articles and structures in that when subjected to continued heating it swells in use. It is a very important characteristic of zircon that it neutralizes more or less, the tendency of the silicon to swell, depending somewhat upon the amount of zircon mixed with the silicon. It has been found that the native zircon of the grade obtained by tabling the sand from Pablo Beach in Florida when mixed with silicon in substantially equal parts by weight almost entirely prevents any change in volume in use of the article made from the mixture.

When using zircon as the non-metallic element of the composition according to the present invention, orthophosphoric acid has been found to be the most satisfactory bond. This appears to be for the reason that phosphoric acid forms a double salt of silicon and zirconium; that is, a silicon-zirconium phosphate which is both non-volatile and highly refractory and has a strong bonding action. However, any mineral acid forming a non-volatile compound with either the silicon or with the metallic component of the non-metallic refractory element of the mixture or other non-volatile bond, may be used. A bonding compound volatile at 2500° F. produces porosity and reduces the heat conductivity of the composition below that desired within the present invention.

An example of the preferred composition according to the present invention and of its preferred method of manufacture is as follows: Native zircon is milled so that most of the milled material will pass through 200 mesh screen. Silicon or a ferrosilicon alloy high in silicon (preferably 75% or more silicon), is ground to pass through a screen of from 140 to 200 mesh. Preferably 50 parts (by weight), of the milled zircon is mixed with 50 parts (by weight), of ground silicon or ferrosilicon; or crystalline, graphitic or amorphous silicon may be used. The mixture of the non-metallic and metallic elements of the composition is then mixed with 6 parts (by weight), of orthophosphoric acid (sp. gr. 1.71). It is advantageous that a large percentage of the zircon be even finer than 200 mesh, whereas little difference is observable if the silicon or ferrosilicon is ground only to say 140 mesh. No material difference is obtained by varying the phosphoric acid between 4 and 6 per cent, although 6 per cent is preferred. After the acid has been thoroughly mixed with the other elements of the composition the mixture is shaped as desired and fired. A firing temperature of about 2600° F. is desirable especially if the composition is intended to operate at 2600° F. or over. Observation of the fired product indicates that the acid reacts with the zircon and silicon or ferrosilicon to form a mixture of zirconium, silicon and iron phosphates with the silicon phosphate predominating. However, we do not limit ourselves to any particular theory of bonding action. Neither do we limit ourselves to zircon or to equal parts of metallic and non-metallic ingredients. The non-metallic portion should, however, be a substantial proportion of the metallic portion in order to maintain the crushing strength of the composition at temperatures of 2500° F. or over.

The material formed as described in the above example has an average thermal conductivity at temperatures above 2000° F., at least equal, if not superior, to that of cast iron. Moreover, the composition in question can be safely operated continuously at temperatures in the neighborhood of 2600° F. and it will have, at temperatures of the order of 2000° F. and over, a strength comparable or superior to the materials ordinarily used for heat transfer at such temperatures.

It will be understood, that if other non-metallic refracory of high softening point or other bond is substituted for the preferred refractory and bond as given in the above example, the capacity to resist heat and the capacity to transmit heat will both be affected adversely to some extent, but the material is nevertheless usable at temperatures above 2000° F. and has a heat transmission at least equal to one-half that of cast iron and better than that of bonded carborundum, irrespective of the non-metallic refractory used. Moreover, the material or composition according to the present invention is of moderate cost and is resistant to gaseous corrosion and erosion at temperatures up to 2750° F. without softening. Also, the preferred embodiment of the present invention does not fail at 2500° F. until a compression under test load of 650 pounds per square inch is applied.

It will be understood that by "high softening point" as used in the above specification and in the following claims with reference to the non-metallic refractory used, we mean a non-metallic material which does not soften at temperatures below 3000° F.

Having thus described our invention we claim:

1. A composition of matter comprising substantially equal parts of zircon and silicon bonded by reaction products of phosphoric acid therewith and having a coefficient of heat transmission equal to bonded carborundum at temperatures above 2000° F., and capable of commercial use at 2600° F.

2. The method of making a composition of matter having high coefficient of heat transmission and high resistance to corrosion and erosion at temperatures above 2000° F. comprising mixing ground silicon with finely divided zircon, treating said mixture with from four to six per cent of phosphoric acid and shaping the mixture and firing it.

3. The method of making a composition of matter having high coefficient of heat transmission and high resistance to corrosion and erosion at temperatures above 2000° F., comprising mixing ground silicon with zircon, treating said mixture with a mineral acid reacting with the elements of said mixture to form products none of which are volatile at temperatures at 2600° F., shaping the mixture and firing it.

4. A composition of matter comprising substantially equal parts by weight of zircon and silicon bonded by a compound non-volatile at 2600° F., the composition being resistant to gaseous corrosion and erosion at 2600° F. and having a heat conductivity equal to bonded carborundum at temperatures above 2000° F.

5. A composition of matter comprising substantially equal parts by weight of zircon and silicon.

JOHN D. MORGAN.
WILLIAM G. BJORKSTEDT.
RUSSELL E. LOWE.